United States Patent [19]

Vaugh et al.

[11] Patent Number: 4,720,289

[45] Date of Patent: Jan. 19, 1988

[54] PROCESS FOR GASIFYING SOLID CARBONACEOUS MATERIALS

[75] Inventors: Stephen N. Vaugh, Webster; Robert Lang, Baytown, both of Tex.

[73] Assignee: Exxon Research and Engineering Company, Florham Park, N.J.

[21] Appl. No.: 751,927

[22] Filed: Jul. 5, 1985

[51] Int. Cl.$^4$ .............................................. C10J 3/54
[52] U.S. Cl. ................... 48/197 R; 48/202; 48/206; 252/373; 502/53
[58] Field of Search ............... 48/197 R, 202, 210, 48/206; 252/373; 201/36, 38, 2.5; 502/34, 53, 55, 514, 518

[56] References Cited

U.S. PATENT DOCUMENTS

| | | | |
|---|---|---|---|
| 2,840,462 | 6/1958 | Gorin | 48/197 R |
| 3,004,839 | 10/1961 | Tornquist | 48/197 R |
| 3,817,723 | 6/1974 | Donath | 48/197 R |
| 3,840,354 | 10/1974 | Donath | 48/202 |
| 3,854,896 | 12/1974 | Switzer et al. | 48/210 |
| 3,929,431 | 12/1975 | Koh et al. | 48/197 R X |
| 3,957,460 | 5/1976 | Lee | 48/197 R |
| 3,958,957 | 5/1976 | Koh et al. | 48/197 R |
| 3,985,519 | 10/1976 | Kalina et al. | 48/202 |
| 4,094,650 | 6/1978 | Koh et al. | 48/197 R |
| 4,095,959 | 6/1978 | Kunstle et al. | 48/73 |
| 4,226,698 | 10/1980 | Schroeder | 208/8 R |
| 4,292,048 | 9/1981 | Wesselhoft | 48/197 R |
| 4,300,916 | 11/1981 | Frewer | 48/210 |
| 4,322,243 | 3/1982 | Frewer et al. | 75/34 |
| 4,328,009 | 5/1982 | Fischer et al. | 48/202 |
| 4,337,067 | 6/1982 | Jager et al. | 48/202 |

Primary Examiner—Barry S. Richman
Assistant Examiner—Joye L. Woodard
Attorney, Agent, or Firm—Wayne Hoover; Roy J. Ott

[57] ABSTRACT

A process for gasifying a non-gaseous solid material wherein a portion of the gasification is accomplished in the presence of steam and another portion of the gasification is accomplished in the presence of hydrogen and in the substantial absence of carbon dioxide and steam. The gasification will be accomplished at an elevated temperature and pressure. The essence of the invention resides in the discovery that carbon alkali metal catalyst, generally used for the gasification of carbonaceous materials, will deactivate in the presence of carbon dioxide, especially if the alkali metal carbonate is stable at gasification conditions and in the discovery that this deactivation can be either significantly reduced if the initial portion of the gasification is completed in the presence of hydrogen and in the substantial absence of steam and carbon dioxide or if after the catalyst has become partially deactivated, the activity is restored by completing a portion of the gasification in the presence of hydrogen and in the substantial absence of steam and carbon dioxide.

8 Claims, 7 Drawing Figures

PROCESS FOR GASIFYING SOLID CARBONACEOUS MATERIALS

BACKGROUND OF THE INVENTION

This invention relates to an improved process for converting non-gaseous carbonaceous materials to gaseous carbonaceous materials. More particularly, this invention relates to an improved process for gasifying normally solid carbonaceous materials.

Heretofore, several processes have been proposed for converting solid carbonaceous materials to gaseous products which may then be used either as fuels or as feeds to various processes such as the Fischer-Tropsch process. In these processes, the solid carbonaceous material is contacted with a suitable gasification agent at elevated temperatures. The processes may be either thermal or catalytic. Suitable gasification agents include hydrogen, steam, carbon dioxide, synthesis gas and the like.

Of these several processes, the catalytic processes, particularly those wherein an alkali metal catalyst is employed, would appear to offer the greater advantages since the catalytic processes may be operated at significantly lower temperatures thereby reducing the amount of heat required to effect the conversion. Moreover, lower temperature operations tend to favor the production of methane which is frequently a particularly preferred gasification product.

As is well known, an extensive research effort has been completed on catalytic gasification processes wherein an alkali metal hydroxide or an alkali metal salt is used as a catalyst or catalyst precursor. As is also well known, processes of this type would appear to offer tremendous advantages particularly in the gasification of solid carbonaceous materials. More recently, however, it has been learned that the activity of the alkali metal catalysts decrease as the conversion proceeds when steam is used as the gasification agent at elevated pressures; i.e., pressures above about 100 psig. This reduced catalytic activity results in a reduced conversion of carbon to the desired gaseous products at any given holding time thereby detracting from the other process advantages. Heretofore, it had been believed necessary to either use larger gasifiers, higher temperatures, higher steam rates or a combination of these to offset the lower conversion associated with the catalytic activity. All of these, however, lead to increased costs. The need, then, for an improved process wherein the reduction in catalytic activity is either eliminated or reduced is believed readily apparent.

SUMMARY OF THE INVENTION

It has now been discovered that the foregoing and other disadvantages of the prior art processes can be avoided or at least reduced with the method of the present invention and an improved process for gasifying liquid and solid carbonaceous materials provided thereby. It is, therefore, an object of this invention to provide an improved process for the gasification of liquid and solid carbonaceous materials. It is another object of this invention to provide such an improved process wherein the gasification is accomplished, at least partially, by contacting the carbonaceous material with steam at an elevated temperature and pressure in the presence of an alkali metal catalyst. It is still a further object of this invention to provide such an improved process wherein the reduction in catalytic activity as the conversion proceeds is reduced. The foregoing and other objects and advantages will become apparent from the description set forth hereinafter and from the drawings appended thereto.

In accordance with the present invention, the foregoing and other objects and advantages are accomplished by at least partially gasifying a solid carbonaceous material at elevated temperatures and pressures in the presence of steam and an alkali metal catalyst in such a way as to reduce the net reduction in catalytic activity during the gasification. This may be accomplished by either completing the initial portion of the gasification in a way designed to preserve the initial catalytic activity or by subjecting partially steam gasified char to reducing conditions in an atmosphere substantially free of carbon dioxide. Preservation of catalytic activity may be accomplished by starting and continuing the gasification with a gasification agent which does not produce carbon dioxide in an environment substantially free of carbon dioxide and thereafter completing the gasification in the presence of steam. The improved process of this invention may be accomplished in a single or plurality of stages.

DETAILED DESCRIPTION OF THE INVENTION

As indicated, supra, the present invention relates to an improved process for converting solid carbonaceous materials to gaseous products wherein the carbonaceous material is at least partially gasified by contact with steam at elevated temperature and pressure and in the presence of an alkali metal catalyst. As used in the description of this invention, the recitation "alkali metal catalyst" is intended to mean a catalyst derived from contacting an alkali metal hydroxide or alkali metal salt with a carbonaceous material at elevated temperature. This catalyst is referred to frequently in the prior art as a carbon/alkali-metal catalyst.

Figure 1A:
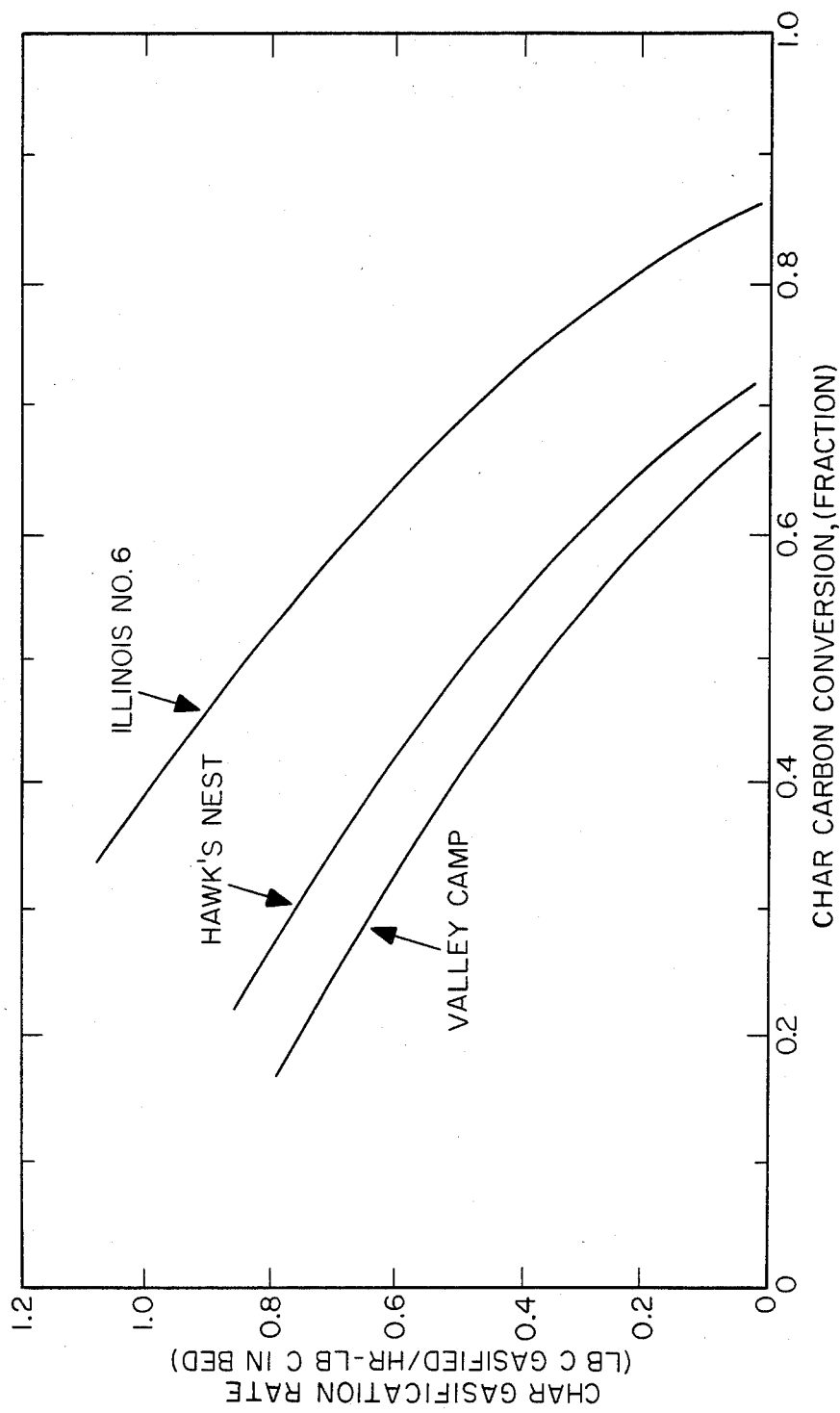
FIG. 1A is a graph of catalytic activity v percent carbon conversion.
Figure 1B:
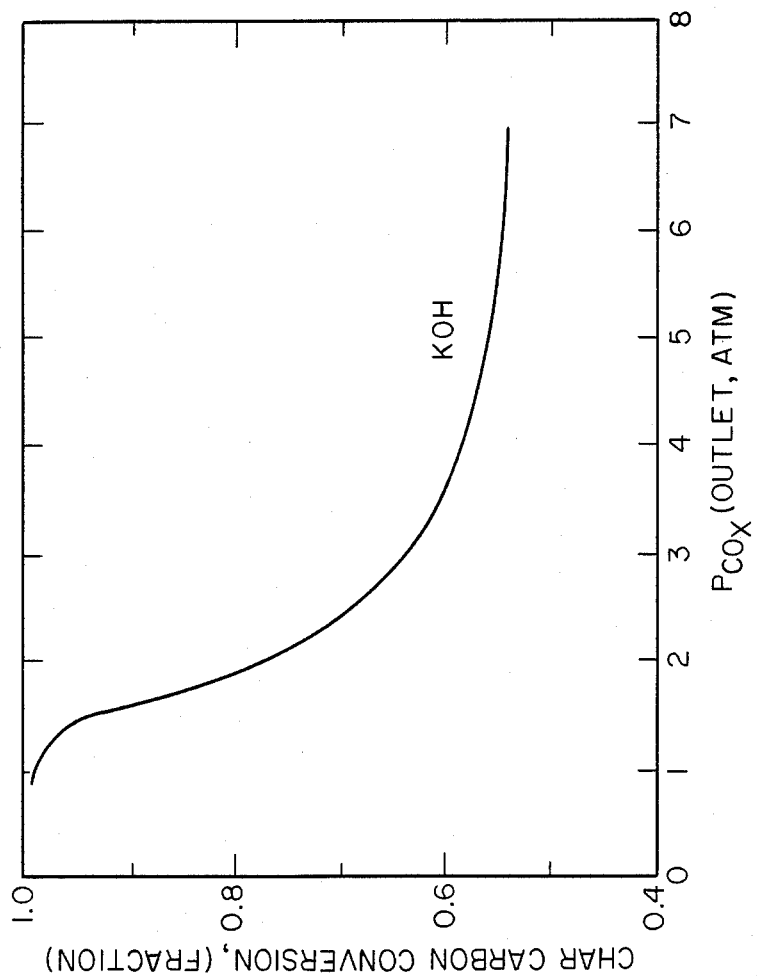
FIG. 1B is a graph of catalytic activity v $CO_x$ partial pressure.

As also indicated, supra, the activity of the alkali metal catalyst decreases as the gasification proceeds when the gasification is accomplished in the presence of steam at elevated pressures; i.e., pressures above about 100 psig. While the inventors do not wish to be bound by any particular theory, it is believed that this deactivation results from a conversion of the alkali metal catalyst to an alkali metal carbonate. The deactivation effect is cumulative and apparently is influenced by the partial pressure of $CO_2$. This is illustrated by FIG. 1B where coal conversion was measured after 4 hours gasification with varying partial pressure of $CO_2$. The reduction in catalytic activity is illustrated in FIG. 1A which is a plot of the specific reaction rate (grams of carbon converted per hour per gram of carbon in the bed) vs. the percent conversion for three different coals; viz., Illinois No. 6, Hawks Nest and Valley Camp. The data reflected in FIG. 1A were obtained in a batch gasification operation using 12 wt. % potassium, based on coal at a temperature of 1300° F. and a pressure of 500 psig. As can be seen in FIG. 1A, the specific reaction rate after about 70% conversion is only about 1/10 the reaction rate at time zero or at zero conversion for each coal.

The essence of the present invention resides in the discovery that this reduction in activity can be avoided or at least reduced if a portion of the gasification, particularly the initial portion of the gasification, is accomplished with a gasifying agent that does not lead to the production of $CO_2$ during gasification and the gasification completed using steam either alone or in combination with one or more other gasifying agents. Alternatively, the catalytic activity can be restored after partial gasification with steam by passing the partially gasified char through a zone having an environment capable of reducing the carbonate, thereby restoring the alkali metal catalyst in an active form, and then completing the gasification in the presence of steam. A gasification agent, which does not lead to the production of carbon dioxide, may be present in the environment wherein the carbonate is reduced or converted.

In general, the method of the present invention may be used to convert any solid carbonaceous material at least in part to gaseous products. Suitable normally solid carbonaceous materials include, but are not necessarily limited to, coal, trash, biomass, coke, tar sand bitumen, spent shale, petroleum coke and the like. This invention is particularly useful in the catalytic gasification of coal and may be used to gasify any of the coals known in the prior art including bituminous coal, subbituminous coal, lignite, peat, brown coal and the like. These materials are, at least initially, solid at conversion conditions.

In general, and when a carbonaceous material, which is solid at conversion conditions, is converted in the improved process of this invention, the same will be ground to a finely divided state. The particular particle size or particle size range actually employed, however, is not critical to the invention and, indeed, essentially any particle size may be employed so long as the particle can be retained in a fluid bed for a sufficient period of time to permit gasification thereof. Notwithstanding that the particle size is not critical, solid carbonaceous materials will, generally, be ground to a particle size between about 4 and 100 on the U.S. Sieve Series Scale.

As indicated, supra, the present invention is applicable to alkali metal catalyzed conversion operations. In this regard, it should be noted that the carbonate of the several alkali metals are not all stable at the standard conditions of gasification and, as a result, the present invention will offer an advantage only with those alkali metals which are being used as a catalyst at conditions at which the carbonate is stable. In this regard, it should be noted that the carbonates of sodium and potassium tend to be stable over the full range of gasification conditions contemplated for use in the present invention. The carbonates of rubidium and cesium, on the other hand, tend to be less stable at the higher temperatures within the ranges contemplated herein. More particularly, the present invention would, then, be applicable to gasification operations wherein rubidium or cesium is used as a catalyst at a temperature within the range from about 1000° F. to about 1200° F. Also in this regard, it should be noted that cesium, which has been heretofore considered the better of the alkali metals for use as a catalyst, may well have been more effective simply because the catalytic activity was not subject to reduction as a result of association of the cesium with carbon dioxide at the temperatures normally used for such gasifications.

In general, any of the techniques known in the prior art to be useful in incorporating a gasification catalyst may be used to incorporate the alkali metal catalyst in the process of the present invention. For example, and when carbonaceous materials having reactive sites are gasified, ion exchange may be used to incorporate the alkali metal into the solid carbonaceous material. Alternatively, or with similar techniques. In either of these cases, the alkali metal precusor will, generally, be contacted with the carbonaceous material in a suitable solvent such as water. Generally, the solvent will separated prior to gasification but, for reasons already known in the prior art, such separation is not essential. After the alkali metal has been combined with the carbonaceous material, the active catalyst may then be formed by heating the combined alkali metal/carbonaceous material mixture to a temperature within the range from about 600° F. to about 1500° F. Formation of the active catalyst species may be accomplished in a separate step or the same may simply be accomplished during heat up to the gasification conditions.

Once the catalyst or catalyst precursor has been incorporated and the active catalyst formed, gasification in accordance with the present invention will be accomplished in a plurality of stages, either in a single or plurality of vessels. In one embodiment, the gasification may be accomplished in a staged single vessel wherein one of the stages is substantially free of steam and carbon dioxide while steam gasification is effected in one or more other stages. When a fluid bed is maintained in the single vessel, the particles to be gasified will move randomly from one stage to the other and catalytic activity will be at least partially restored each time a particle passes through the stage which is is free of $CO_2$. In an alternative embodiment, the environment free of steam and carbon dioxide may be maintained in one or more separate vessels with particles being transferred from one vessel to another.

The nominal holding time in each stage may be controlled so as to maximize the yield of desired gaseous products. The gaseous products may then be withdrawn, scrubbed and further separated into any desired fractions or compositions. Moreover, the gaseous product may be subjected to further treatments such as reforming or a water-gas shift to still further maximize the yield of desired products.

Any residue remaining after the gasification may also be withdrawn from one or more stages and simply discarded or subjected to further treatment as desired. Generally, the residue thus withdrawn will contain spent catalyst and the same will be treated to recover all or at least a portion thereof. The recovered spent catalyst may then be reactivated and reused in the gasification operation.

Figure 2:
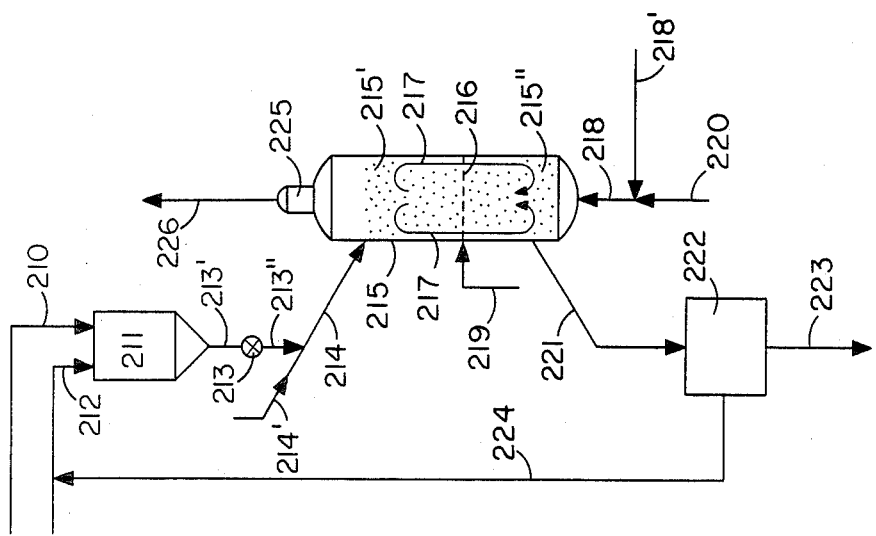
FIG. 2 is a schematic flow diagram of a process within the scope of the present invention wherein catalytic activity is preserved and the gasification accomplished in a staged single vessel.

It is believed that the present invention will be better understood by reference to certain of the attached figures. Referring, then, to FIG. 2, there is illustrated a process within the scope of the present invention wherein the gasification is effected in a plurality of stages in a single vessel. In the embodiment illustrated, a carbonaceous feed material is introduced into hopper 211 where it is combined with an alkali metal catalyst precursor introduced through line 212. When a carbonaceous material is a solid such as a bituminous or lower ranking coal, oil shale, petroleum coke, char, charcoal or a similar solid material, the carbonaceous material will be introduced in a finely divided state. In general, the carbonaceous material will be combined with a sufficient amount of precursor to provide from about 1 to about 10 wt. %, preferably from about 5 to about 8 wt. % of metal based on the initial amount of carbonaceous material. The optimum amount of metal for a particular operation will depend upon the particular alkali metal precursor compound selected and the particular carbonaceous material being gasified. Notwithstanding this, and is well known in the prior art, greater amounts of lithium and/or sodium would generally be used than potassium or cesium.

In the embodiment illustrated, the mixture of carbonaceous material and catalyst precursor are transferred from hopper 211 to staged gasifier 215. While not illustrated, the mixture of carbonaceous material and catalyst precursor could be heated to a temperature within the range from about 600° F. to about 1500° F. so as to convert the alkali metal catalyst precursor to the active alkali metal-carbon catalyst species and to separate volatile material when desired. As indicated, supra, however, the desired conversion and devolatilization will occur spontaneously as the mixture enters the heated gasifier. As a result, a separate heating step is not, generally, required.

In the embodiment illustrated, the flow of carbonaceous material to the gasifier may be controlled with suitable means 213. The mixture of carbonaceous material and catalyst precursor will flow through lines 213', 213" and 214 to the gasifier 215. When the carbonaceous material is a finely divided solid, suitable flow control means 213 may be any one of the mechanical devices known in the prior art to be useful for transferring a solid material such as a star feeder, a screw conveyor or the like. Transfer to the gasifier may be facilitated by the introduction of an inert gas into line 214 through line 214'.

In the embodiment illustrated, gasifier 215 comprises an upper stage 215' and a lower stage 215". The two stages comprise a continuous fluid bed of carbonaceous material at various stages of conversion and the upper and lower stages are separated by a suitable gas distributing baffling means 216. The baffling means will serve as a support for the upper stage but will generally, permit solid particles to pass between the two stages in a flow pattern generally reflected by arrows 217—217. In accordance with the improved method of the present invention, the lower gasification stage will comprise a reducing atmosphere and will, preferably, be a hydrogasification stage with gasification being accomplished in the presence of hydrogen introduced through line 218. The upper stage, on the other hand, will be operated as a steam gasification stage with steam introduced to gas distributing baffle means 216 through line 219.

Sufficient hydrogen will be introduced into the lower stage through line 218 to provide from about 0.1 to about 1.0 parts hydrogen per part by weight of carbonaceous material in the lower stage. Moreover, a sufficient amount of additional gas introduced into line 218 through line 220 will be added to the lower stage to maintain the carbonaceous material in a fluidized state. In a preferred embodiment, the additional gas employed would be one or more of the gasification products such as methane or carbon monoxide, thereby preventing the introduction of impurities which would then later require separation from the product gas. The amount of fluidizing gas introduced with the hydrogen will be that required to maintain a superficial gas velocity in the lower gasification stage within the range from about 0.2 to about 2.0 feet per second. In general, sufficient steam will be introduced through line 219 to provide from about 1.0 to about 30 parts of steam per part of carbonaceous material by weight in the upper stage. The steam introduced through line 219 will, of course, be combined with any unreacted hydrogen introduced into the lower stage, the fluidizing gas introduced into the lower stage and the gaseous products from the gasification in the lower stage. Since, in accordance with the improved method of the present invention, gasification in the lower stage is intended to be completed in the absence of carbon dioxide, care should be exercised to avoid the introduction of carbon dioxide into this stage. In this regard, it should be noted that gas distributing baffling means 216 will minimize the backmixing of gases in the gasifier 215 thereby minimizing the amount of carbon dioxide passing from the upper stage to the lower stage. In the lower stage, hydrogen will react with carbon in the carbonaceous material to produce methane. As is well known, this reaction is exothermic and the heat of reaction will be transferred to the gases and solids in the lower stage and thence to the upper bed as the result of the gases and solids from the lower bed moving into the upper bed. In the upper bed, steam will react with carbon to produce carbon monoxide, hydrogen, methane and carbon dioxide. In addition, the hydrogen produced by this reaction will combine with hydrogen entering the upper stage from the lower stage to react, in part, with carbon and carbon monoxide to produce methane. As is well known in the prior art, the relative amount of each of the gaseous products will vary with the temperature of gasification with the net production of carbon monoxide and hydrogen favored at higher temperatures and a net production of methane favored at lower temperatures. As a result, lower temperatures will, generally, be used where methane is the desired product while higher temperatures will be used when synthesis gas is the desired product. As is also well known, the reaction of steam with carbon is endothermic and, as a result, the upper gasification stage will, generally, operate at a lower temperature than the lower gasification stage unless additional heat is added to the upper gasification stage. This could, of course, be done by introducing steam which is at a temperature above the gasification temperature in the upper stage through line 219. Heat to the lower stage, on the other hand, may be introduced by adding hydrogen and a fluidizing gas through line 218 at a temperature sufficient to bring the lower gasification stage to the desired temperature.

In general, the relative size of the upper and lower gasification stages 215' and 215", respectively, will be controlled such that from about 40 to about 80% of the total conversion occurs in the upper stage while from about 20 to about 60% of the total conversion occurs in the lower stage. Since conversion in the lower stage occurs in the substantial absence of carbon dioxide, the activity of the carbon alkali catalyst will be restored while solids are in this stage and, as the particles return to the upper stage, the catalytic activity during steam gasification in the upper stage will be significantly greater than if the total gasification had been accomplished in a single stage or in a plurality of stages with either steam or a mixture of steam and hydrogen.

In the embodiment illustrated in FIG. 2, gasified char is withdrawn from gasifier 215 through line 221. In general, this char will comprise from about 1 to about 20 wt. % carbon and from about 80 to about 99 wt. % inorganic materials including spent catalyst. The gasified char may, then, be treated to recover the spent catalyst in catalyst recovery unit 222. In general, any of the catalyst recovery techniques known in the prior art including those described in U.S. Pat. No. 4,193,772; 4,334,893 and 4,365,975 may be used to recover the spent catalyst. The ash, less any recovered spent catalyst, may be withdrawn through line 223 and discarded while the recovered spent catalyst may be reused by recycling the same through line 224 to line 212.

In the embodiment illustrated in FIG. 2, the product gas which will, generally, contain entrained solids, passes through suitable means 225 wherein the solids are separated and returned to the upper stage and is finally withdrawn through line 226. The product gas will comprise, generally, methane, hydrogen, carbon monoxide, carbon dioxide and steam. Depending upon the particular carbonaceous material converted in the gasifier, the product gas may also comprise $H_2S$. As is well known in the prior art, the steam may be separated from the gaseous product via condensation. Also, acid gases such as $CO_2$ and $H_2S$ may be separated via scrubbing. Further, the remaining components such as methane, carbon monoxide and hydrogen may be separated via a cryogenic separation. All or a portion of the condensed steam may be recycled and used as steam ultimately introduced through line 219. Similarly, all or a portion of the hydrogen and CO may be used as a source of hydrogen and fluidizing gas introduced through line 218'. The methane may be withdrawn and used as a pipeline gas or reformed to produce additional carbon monoxide and hydrogen.

Figure 3:
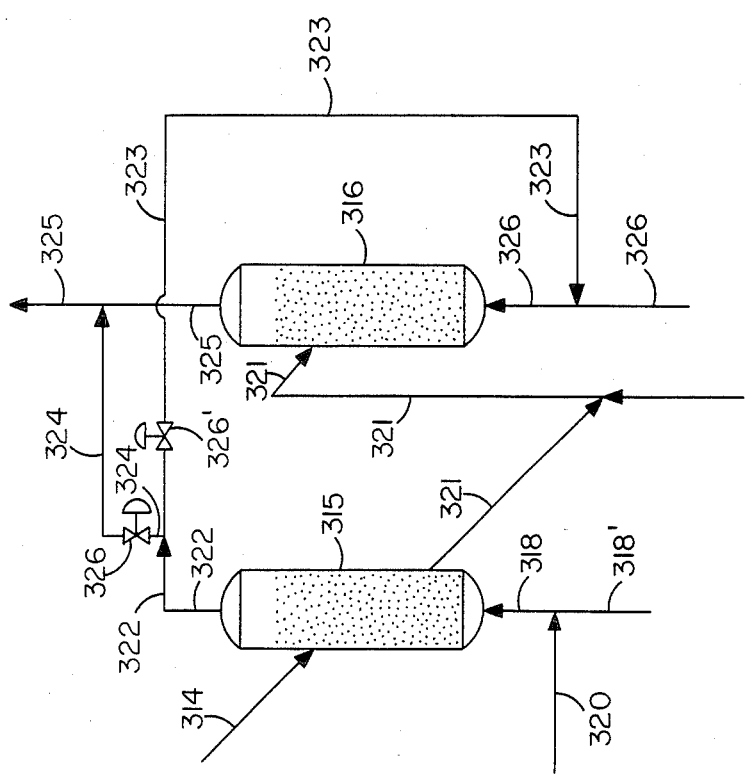
FIG. 3 is a schematic flow diagram of a process within the scope of the present invention wherein restoration is accomplished during gasification in a plurality of vessels.

An alternate embodiment of the present invention wherein steam and hydrogasification are accomplished in separate stages and in separate vessels is illustrated in FIG. 3. Referring, then, to FIG. 3, a mixture of a carbonaceous material and an alkali metal catalyst precursor is fed to first stage gasifier 315 through line 314. It will be appreciated that the mixture may be prepared in the same manner as described in the discussion of FIG. 2 where the carbonaceous material and the catalyst precursor were combined in hopper 211. In the embodiment illustrated, the atmosphere in the gasifier 315 will be substantially free of carbon dioxide to thereby avoid any reduction in catalytic activity as a result of conversion of the carbon alkali catalyst to a corresponding alkali carbonate. In general, the gasifier 315 will be operated at a temperature within the range from about 1200° to about 1500° F. and at a pressure within the range from about 300 to about 1500 psig. A fluid bed gasifier is illustrated in FIG. 3 but it will be appreciated by those skilled in the art that this gasifier could also be operated either as a fixed or moving bed gasifier. Hydrogen required to effect the gasification may be introduced into line 318 from line 318' and thence into the gasifier 315. The hydrogen may be pure or combined with other gaseous materials such as carbon monoxide but will substantially exclude $CO_2$ and steam. In any case, a sufficient amount of hydrogen will be introduced to provide from about 0.1 to about 1.0 parts of hydrogen per part of carbonaceous material in the gasifier. To the extent required, a fluidization gas may be introduced into line 318 through 320. The fluidization gas may be inert or the same may be any one or more of the gasification products except steam and carbon dioxide. Generally, then, the fluidization gas would be either methane or carbon monoxide or a mixture of both. In general, the holding time in gasifier 315 will be controlled such that from about 20 to about 60 wt. % of the carbon in the carbonaceous material feed is converted to methane via the reaction of carbon with hydrogen. After the desired amount of carbon has been converted, the partially gasified char will be withdrawn through line 321—321 and passed to second stage gasifier 316. All or a portion of the gaseous product from the first stage gasifier 315 may be withdrawn through line 322—322 and passed to second stage gasifier 316 through lines 323—323. Conversely, all or any portion of the gaseous product from the first stage gasifier may be withdrawn through lines 324—324 and combined with a gaseous product from the second stage gasifier 316 in line 325. The actual division of the gaseous product from first stage gasifier 315 may be controlled by controlling the relative positions of valves 326 and 326'. In the second stage gasifier 316, conversion of the carbonaceous material will be completed in the presence of steam introduced through line 326—326. The steam may be introduced in combination with any of the gaseous product from first stage gasifier 315 passed through lines 323—323. In general, a sufficient amount of the gaseous product from first stage gasifier 315 will be combined with the steam as is required to maintain the desired superficial gas velocity in second stage gasifier 316 when a fluid bed operation is employed. Again, and while a fluidized bed gasifier has been illustrated, it will be appreciated by those skilled in the art that the second stage gasifier could be operated either as a fixed or moving bed gasifier. In general, a sufficient amount of steam will be introduced through lines 326—326 to provide from about 1.0 to about 30 parts of steam per part of carbon on a weight basis. In general, the holding time of the second stage gasifier 316 will be adjusted so as to permit the conversion of from about 40 to about 80 wt. % of the total carbon and the carbonaceous material feed in this second stage. The gaseous product from the second stage will be withdrawn through lines 325—325. The gaseous product thus withdrawn will include any gaseous materials introduced into the second stage through lines 323—323, the reaction products thereof in the second stage gasifier and ultimately any product added from the first stage through line 324. Again, the gaseous product will comprise methane, carbon monoxide, hydrogen, carbon dioxide and steam. The gaseous product may also contain hydrogen sulfide. The total product from the two stages of gasification may, of course, be subjected to any of the further treatments and/or separations described in a discussion of the process illustrated in FIG. 2.

Figure 4:
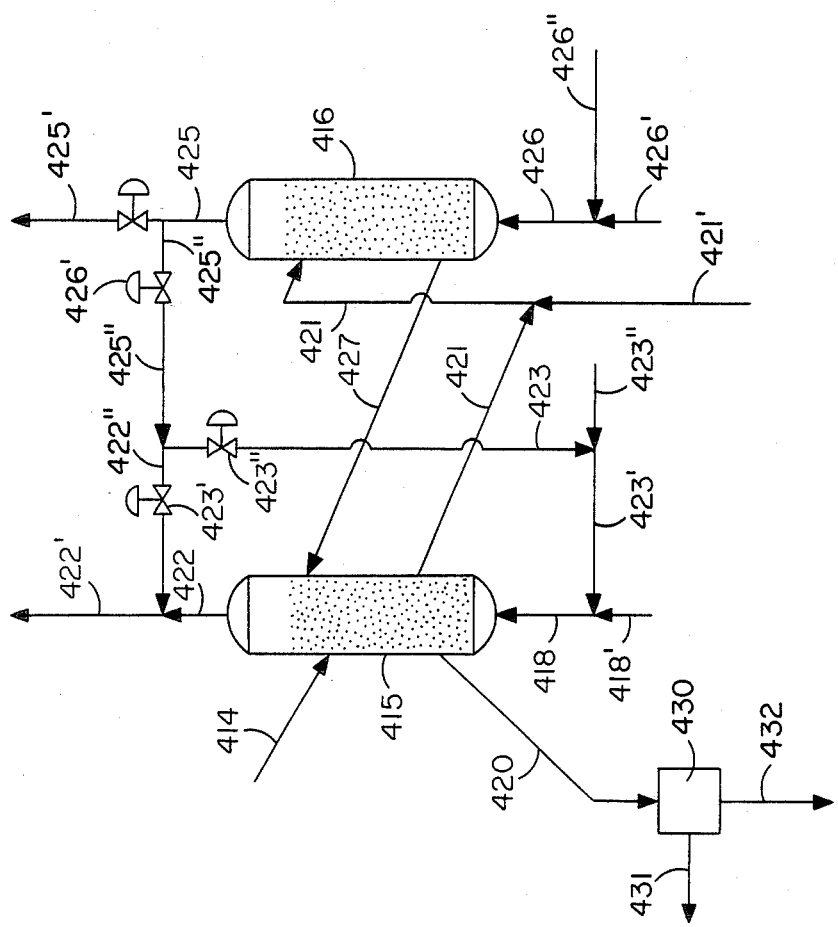
FIG. 4 is a schematic flow diagram of a process within the scope of the present invention wherein restoration is accomplished during gasification in a plurality of vessels.

A still further alternative embodiment of the present invention, and a particularly preferred embodiment thereof, wherein the gasification is accomplished firstly in a steam environment, secondly, in a reducing atmosphere which is free of steam and carbon dioxide and, thirdly, in a steam environment is illustrated in FIG. 4. Referring, then, to FIG. 4, a carbonaceous material comprising an alkali metal catalyst precursor or an active alkali metal carbon catalyst if the mixture were heated prior to introduction into the gasifier is introduced into first stage gasifier 415 through line 414. In the first stage gasifier 415, the carbonaceous material is contacted with steam introduced through line 418' and thence into the gasifier through line 418. The steam may be combined with gaseous product from second stage gasifier 416 which may be passed into line 418 through lines 423 and 423' or when such gas is not used or, during start up, the steam may be combined with a suitable fluidizing gas introduced into line 418 through lines 423" and 423'. In general, the first stage gasifier 415 will be operated at a temperature within the range from about 1200° to about 1500° F. and at a pressure within the range from about 300 to about 1500 psig. The nominal holding time in the first stage gasifier will, generally, be controlled such that from about 40 to about 80 wt. % of the carbonaceous material is converted to gaseous products in the first stage gasifier and in the presence of steam.

In the embodiment illustrated in FIG. 4, a portion of the carbonaceous material in the first stage gasifier 415 is continuously withdrawn through lines 421—421 and passed to second stage reducing zone 416. Transfer of the carbonaceous material from first stage gasifier 415 to second stage gasifier 416 may be facilitated by the introduction of a carrier gas through line 421'. In general, any carrier gas could be employed but in a preferred embodiment the carrier gas will be identical to one or more of the normal gasification products and, since the carrier gas will enter the second stage gasifier, it is essential to the present invention that the carrier gas be free of carbon dioxide. In the second stage reducing zone 416, the carbonaceous material will, preferably, be contacted with hydrogen introduced through line 426' and then 426. The contacting will be accomplished in the substantial absence of carbon dioxide such that the decrease in catalytic activity experienced in the first stage gasifier 415 may be restored. The hydrogen may be combined in line 426 with a suitable fluidization gas introduced through line 426". Again, any suitable fluidization gas may be introduced through line 426", but the fluidization gas should be substantially free of both steam and carbon dioxide. In general, the amount of gas introduced through line 426 will be sufficient to maintain a fluid bed, when a fluid bed operation is employed. In general, the nominal holding time in the second stage gasifier 416 will be controlled such that from about 20 to about 60 wt. % of the initial carbonaceous material is converted to gaseous products therein. Partially gasified carbonaceous material from second stage gasifier 416 will be continuously withdrawn through line 427 and returned to first stage gasifier 415. Since the catalytic activity of the catalyst transfer through line 427 has been restored, further conversion of the carbonaceous material transferred through line 427 will occur at a much greater rate than if the material had not been withdrawn through line 421 passed through a reducing zone and returned to the first stage, steam gasifier 415.

Gaseous product from the second stage gasifier 416 will be withdrawn through line 425. All or any portion of this gaseous product may be withdrawn separately through line 425'. Alternatively, all or a portion of the gaseous product may be passed through lines 425"—425" from where all or a portion may be combined with the gaseous product from the first stage gasifier in line 422' by passage through line 422" or all or a portion may be passed through line 423 and ultimately combined with steam introduced through line 418. The relative division of product gas from the second stage gasifier into lines 425' and 425" may be controlled by valves 426 and 426'. The ultimate division of product into lines 422" and 423 may be controlled by valves 423' and 423".

Gaseous product from the first stage gasifier 415 will be withdrawn through lines 422 and 422'. In the embodiment illustrated in FIG. 4, gasification residue containing spent catalyst is withdrawn from first stage gasifier 415 through line 420 and passed to catalyst recovery section 430. Residue less any recovered spent catalyst may then be withdrawn through line 432 while recovered spent catalyst is recovered through line 431. The recovered spent catalyst may be used in the preparation of feed through line 414 while the residue withdrawn through line 432 may be discarded directly or subjected to further treatments as desired.

PREFERRED EMBODIMENT

In a preferred embodiment of the present invention, a solid carbonaceous material, most preferably a coal, will be gasified in an embodiment such as that illustrated in FIG. 4. In the preferred embodiment, the solid carbonaceous material will be combined with from about 0.05 to about 0.08 parts of potassium per part of solid carbonaceous material by weight prior to introduction into the first stage, steam gasifier. Both the first stage, steam gasifier and the second stage reducing zone will be operated at a temperature within the range from about 1200° to about 1400° F. at a pressure within the range from about 300 to about 600 psig. The nominal holding time in the first stage, steam gasifier, will be controlled such that from about 40 to about 80 wt. % of the initial carbonaceous material feed is gasified in the presence of steam while the nominal holding time in the second stage, hydrogasifier, will be controlled such that from about 20 to about 60 wt. % of the initial carbonaceous feed material is gasified in the presence of hydrogen and in the substantial absence of carbon dioxide and steam. In the preferred embodiment, from about 20 to about 70 wt. % of the initial carbonaceous material will be gasified in the first stage before the same is withdrawn and passed to the second stage. Gasifying 10 to 60 wt. % of the partially gasified carbonaceous feed material from the second stage will be gasified in the first stage after it is returned to the first stage.

Having thus broadly described the present invention and a preferred embodiment thereof, it is believed that the same will become even more apparent by reference to the following examples. It will be appreciated, however, that the examples are presented solely for purposes of illustration and should not be construed as limiting the invention.

EXAMPLE 1

In this example, 10 grams of Hawks Nest, bituminous coal were combined with 1.5 grams of potassium hydroxide and placed in a fixed bed gasifier that could be operated at elevated temperatures and pressures. The sample was heated to 1300° F. and then brought to 250 psig with pure hydrogen. The sample was then gasified at these conditions until about 80% of the carbon in the carbonaceous material had been converted. At this point, steam was introduced and hydrogen flow maintained such that the gasification was continued with a mixture of hydrogen and steam in a mole ratio of 1:1 and at a total pressure of 500 psig. Throughout the gasification, the gasification rate in grams of carbon converted per hour per gram of carbon in the bed was determined as a function of the percent of total carbon conversion. The results of this run are plotted in FIG. 5.

Figure 5:
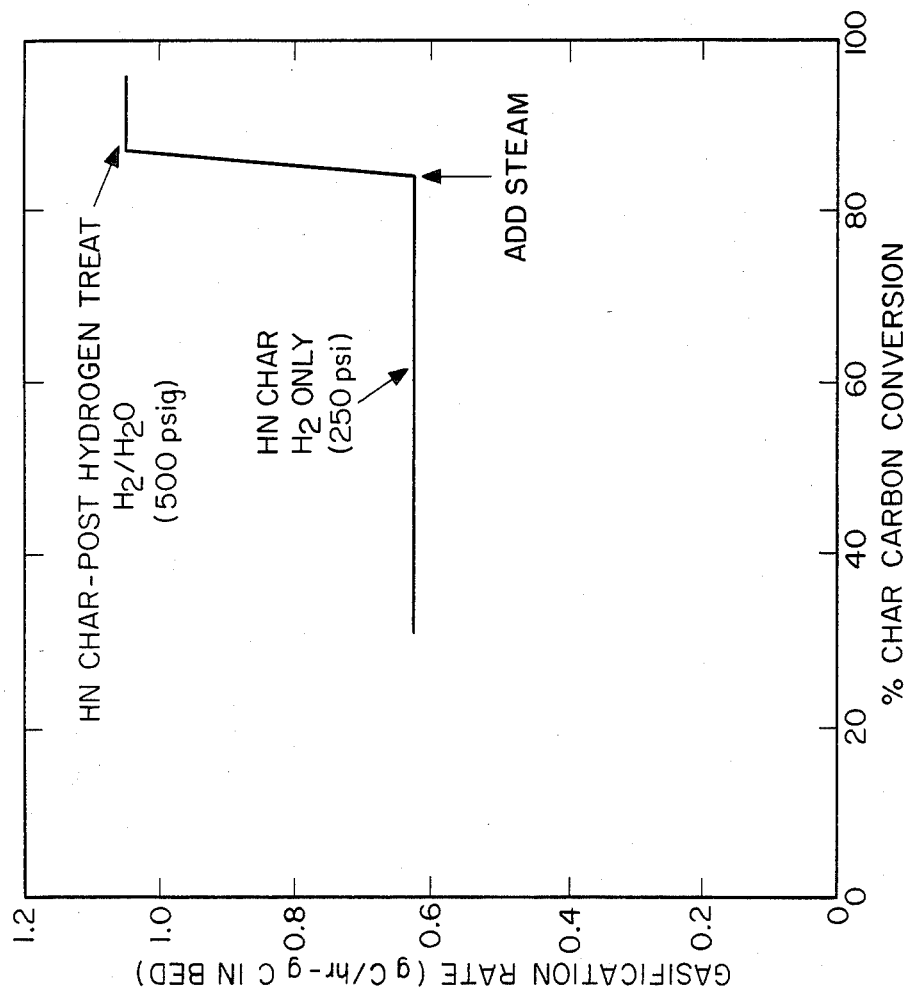
FIG. 5 is a graph of catalytic activity v percent carbon conversion.

As can be seen from FIG. 5, the gasification rate remained generally constant at about 0.6 grams of carbon per hour per gram of carbon in the bed until steam was introduced. The gasification rate increased to slightly greater than 1 gram of carbon per hour per gram of carbon in the bed and remained at this level until nearly 100% carbon conversion was achieved. This high gasification rate in the presence of steam at the end of a gasification run was quite surprising, particularly in light of the decreasing gasification rate behavior in steam/hydrogen illustrated in FIG. 1A.

EXAMPLE 2

Figure 6:
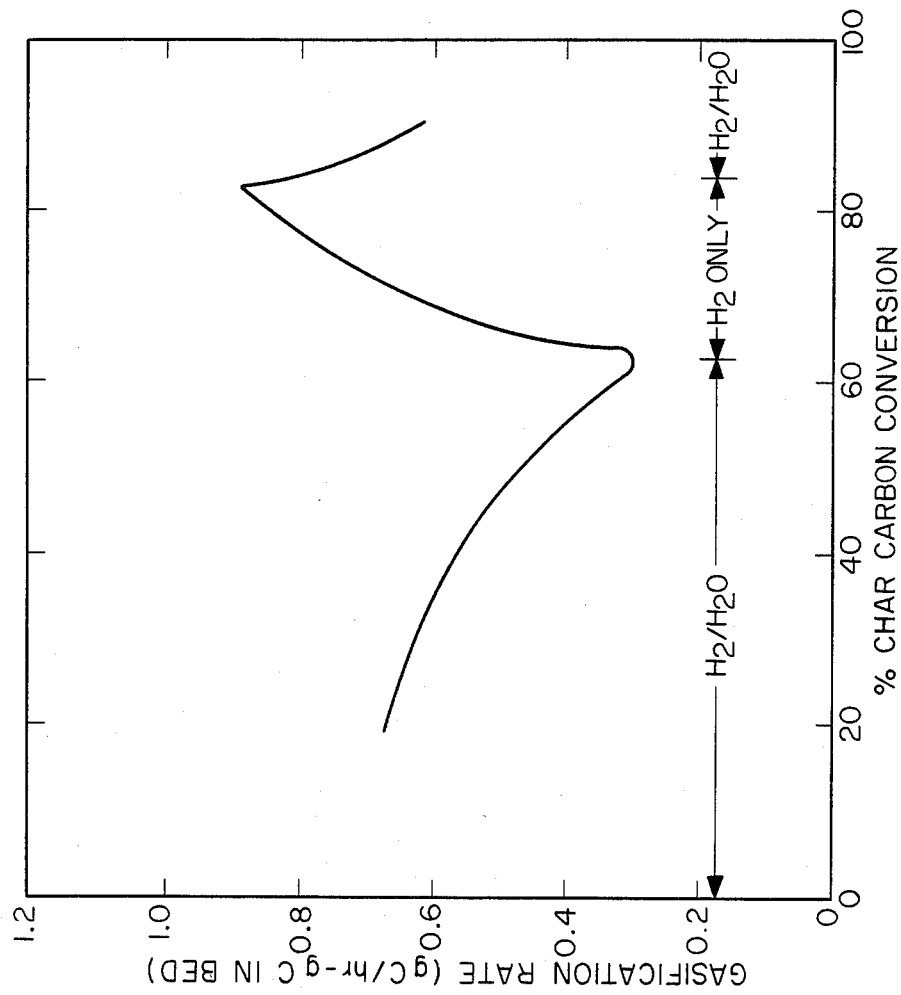
FIG. 6 is a graph of catalytic activity v percent carbon conversion.

In this example, 10 grams of Hawks Nest, bituminous coal were combined with 1.0 grams of potassium hydroxide and placed in the same fixed bed gasifier as was used in Example 1. Again, the sample was heated to 1300° F. and then brought to 500 psig with a mixture of hydrogen and steam in a molar ratio of 1:1. The gasification was continued until about 60% conversion was reached and the steam flow then discontinued while the 500 psig pressure was maintained with hydrogen only. When the steam flow was discontinued, the gasifier was promptly purged of carbon monoxide and carbon dioxide and the gasification allowed to continue in the presence of hydrogen in the substantial absence of steam, carbon monoxide and carbon dioxide until 80% of the carbon in the initial charge had been gasified. At this time, steam was reintroduced with hydrogen such that pressure was maintained with a mixture of steam and hydrogen in a mole ratio of 1:1. Again. the gasification rate as a function of the percent of carbon converted was measured throughout the run and these results are plotted in FIG. 6. As can be seen from FIG. 6, the initial gasification rate decreased with conversion until the use of steam was discontinued. When the gasification was switched to hydrogen alone, the catalytic activity promptly recovered and rose to a value of about 0.9 grams of carbon per hour per gram of carbon in the bed. This, then, restored the catalytic activity to a value of above that at just less than 20% conversion and, while the catalytic activity continued to decrease after steam was reintroduced, the activity above 80% conversion was well above the activity that would have been realized had the activity not been restored via hydrogen gasification.

From the foregoing, it will be apparent that the average catalytic activity of an alkali metal carbon catalyst can be significantly improved during a steam gasification operation if at least a portion of the gasification is accomplished, in the presence of hydrogen and in the substantial absence of carbon dioxide and steam. In the embodiment illustrated in Example 1, the activity of the catalyst was maintained by carrying out the initial portion of the gasification with hydrogen and in the substantial absence of carbon dioxide and steam. Moreover, and when steam was introduced, the activity of the catalyst was significantly greater than when none of the gasification is accomplished in an atmosphere substantially free of carbon dioxide and steam. In the embodiment illustrated in Example 2 and while the relative catalytic activity decreased during the first phase while the gasification was being accomplished in the presence of steam, the catalytic activity was promptly restored when a portion of the gasification was accomplished in the presence of hydrogen and in the substantial absence of carbon dioxide and steam.

While the present invention has been described and illustrated by reference to particular embodiments thereof, it will be appreciated by those of ordinary skill in the art that the same lends itself to variations not necessarily illustrated herein. For this reason, then, reference should be made solely to the appended claims for purposes of determining the true scope of the present invention.

Having thus described and illustrated the invention, What is claimed:

1. A process for gasifying a solid carbonaceous material comprising:
   (a) initially gasifying from about 40 to about 80 wt % of said solid carbonaceous material in the presence of a carbon alkali metal gasification catalyst at an elevated temperature and a pressure above about 100 psig in the presence of steam; and
   (b) gasifying at least a portion of the partially gasified solid carbonaceous material resulting from step (a) at an elevated temperature and pressure in the presence of hydrogen and in an environment substantially free of carbon dioxide and steam such that from about 60 to about 20 wt % of said solid carbonceous material is gasified.

2. The improved gasification process of claim 1 wherein the gasification is accomplished in a staged fluidized bed such that at least a portion of the carbonaceous material moves from a stage wherein the gasification is accomplished in the presence of steam to a stage wherein the gasification is accomplished in the presence of hydrogen and in the substantial absence of steam and carbon dioxide.

3. The improved gasification process of claim 1 wherein the gasification in the presence of hydrogen and in the substantial absence of carbon dioxide and steam is accomplished after a portion of the gasification in the presence of steam has been completed but before the total amount of gasification to be accomplished in the presence of steam has been completed.

4. The improved gasification process of claim 1 wherein the gasification in the presence of steam and the gasification in the presence of hydrogen is accomplished at a temperature within the range from about 1200° to about 1500° F. and at a pressure within the range from about 300 to about 600 psig.

5. The improved gasification process of claim 1 wherein said alkali metal is potassium.

6. A process for gasifying a solid carbonaceous material comprising:
   (a) completing an initial portion of the gasification of said solid carbonaceous material in the presence of a carbon/alkali metal gasification catalyst at an elevated temperature and a pressure above about 100 psig in the presence of steam such, that from about 20 to about 70 wt % of said carbonaceous material is gasified;
   (b) after the initial portion of the gasification of step (a) has been completed, gasifying at least a portion of the partially gasified carbonaceous material resulting from step substantially free of steam and carbon dioxide at an elevated temperature and pressure;

(c) gasifying at least a portion of the partially gasified carbonaceous material resulting from step (b) with steam at an elevated temperature and a pressure above about 100 psig such that from about 10 to about 60 wt % of said partially gasified char from step (b) is gasified and such that from about 40 to about 80 wt % of said carbonaceous material is gasified in steps (a) and (c).

7. The process for gasifying a solid carbonaceous material of claim wherein the initial portion of the gasification of step (a) and the gasification with steam of step (c) are accomplished in the same vessel.

8. The process for gasifying a solid carbonaceous material of claim 6 wherein hydrogen is present in said reducing atmosphere.

* * * * *